United States Patent [19]

Mason, Jr.

[11] 3,940,884
[45] Mar. 2, 1976

[54] MOISTURE RETAINABLE SOIL COVERING WITH INTEGRAL FERTILIZING CAPABILITIES

[75] Inventor: Stanley I. Mason, Jr., Weston, Conn.

[73] Assignee: Simco, Inc., Weston, Conn.

[22] Filed: Apr. 30, 1974

[21] Appl. No.: 465,605

[52] U.S. Cl. .......................................... 47/32; 47/58
[51] Int. Cl.² .......................................... A01G 9/00
[58] Field of Search ............. 47/32, 58, 9; 40/158 R

[56] References Cited
UNITED STATES PATENTS

| | | | |
|---|---|---|---|
| 921,484 | 5/1909 | Turner | 47/32 |
| 1,261,133 | 4/1918 | Kidd | 40/158 R |
| 3,384,993 | 5/1968 | Kane | 47/58 |
| 3,557,491 | 1/1971 | Franklin et al. | 47/9 X |

FOREIGN PATENTS OR APPLICATIONS

| | | | |
|---|---|---|---|
| 1,055,276 | 4/1959 | Germany | 47/32 |
| 588,841 | 2/1959 | Italy | 47/32 |

*Primary Examiner*—Stephen C. Pellegrino
*Attorney, Agent, or Firm*—Haynes N. Johnson

[57] ABSTRACT

A readily adjustable, moisture retainable, air transferable soil covering, integral with fertilizer and, if desired, fungicide is provided that may be used with indoor plants. The soil covering is made up of a biodegradable cellulose paper and film covering having thereon water soluble beads of fertilizer or fungicide. The covering has been perforated in a series of concentric circles together with at least one radial perforation so that the unit may be torn radially to the proper size for the pot, may have an opening in the center for the stem of the plant, and may be torn radially to allow insertion of the stem.

The same type covering may also be utilized in rolls for gardens and can be perforated in regular design for regular spacing of plants.

The perforations serve the additional purpose of providing for water permeability while the film covering prevents moisture evaporation and permits air to reach the soil, As the plant is watered, a certain portion of the fertilizer is dissolved from the undersurface of the discs and enters the soil to feed the plant. Water is also absorbed by the paper and released, with additional fertilizer over a period of time.

5 Claims, 7 Drawing Figures

MOISTURE RETAINABLE SOIL COVERING WITH INTEGRAL FERTILIZING CAPABILITIES

BACKGROUND OF THE INVENTION

This invention relates to care of indoor house plants. It is applicable also to use in outdoor gardens.

Its objective is to prevent the evaporation of water from the soil into the atmosphere (and so lessen the number of waterings needed), to add fertilizer and fungicide, retain heat and prevent weeds, but to permit passage of air between the soil and the atmosphere.

Due to the number of different sizes of pots the design should be such as to allow flexibility of fitting various sizes of pots and around various stem locations in the pots.

SUMMARY OF THE INVENTION

The invention includes a paper material, preferably a biodegradable cellulose paper. Adhered to the upper surface of the paper is a plastic film which will transmit gases (oxygen and carbon dioxide) but which will not transmit moisture.

The discs have a series of concentric perforations. They will also have one or more radial perforations. For convenience of manufacture, the "discs" often have a square outer perimeter so that they can be manufactured from a long sheet and cut off into individual squares.

In use, the disc is torn along one of the concentric perforations so as to give the finished disc a diameter that will fit within the pot and, preferably, have the disc contact the soil. The center disc is also removed to provide for the stem of the plant, and one of the radial perforations is torn to enable the covering to be placed about the plant.

On the underside of the disc, secured to the paper, are a series of beads which may contain fertilizer and/or fungicide. They are water soluble so that when water contacts them a certain amount of fertilizer or fungicide is available to the soil. Preferably the beads are of varying sizes or formulation so that they dissolve at different rates permitting the disc to be useful for a longer period of time.

The beads can be placed on the paper surface in any desired manner, but I have found a simple technique is to prepare a stencil with holes of varying sizes and of thickness equal to the thickness of the beads and simply to stencil the beads on the paper by forcing the material of the wet fertilizer-fungicide mix through the holes in the stencil with a squeegee.

DETAILED DESCRIPTION OF THE INVENTION

The details of my invention are shown in the attached drawings and the accompanying specification.

These drawings are:

Figure 1:
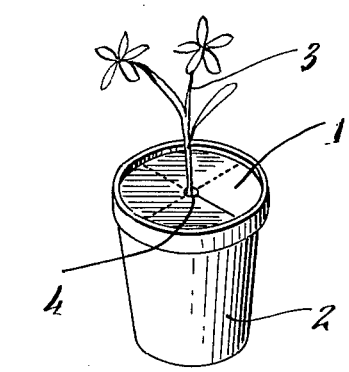
FIG. 1 is a perspective of a plant holder with a flower and carrying the disc covering of my invention.

Turning to the FIGURES, FIG. 1 shows a disc covering in a flower pot 2. The stem of a flower projects through an opening 4 in the center of disc 1. It will be seen that disc 1 substantially covers the entire upper surface of pot 2. Disc 1 has slot 6 that has been used to get the disc around stem 3.

As positioned in pot 2, disc 1 has the film layer uppermost with the cellulose backing below it and secured to it, and the beads of fertilizer and/or fungicide below the cellulose paper.

Figure 2:
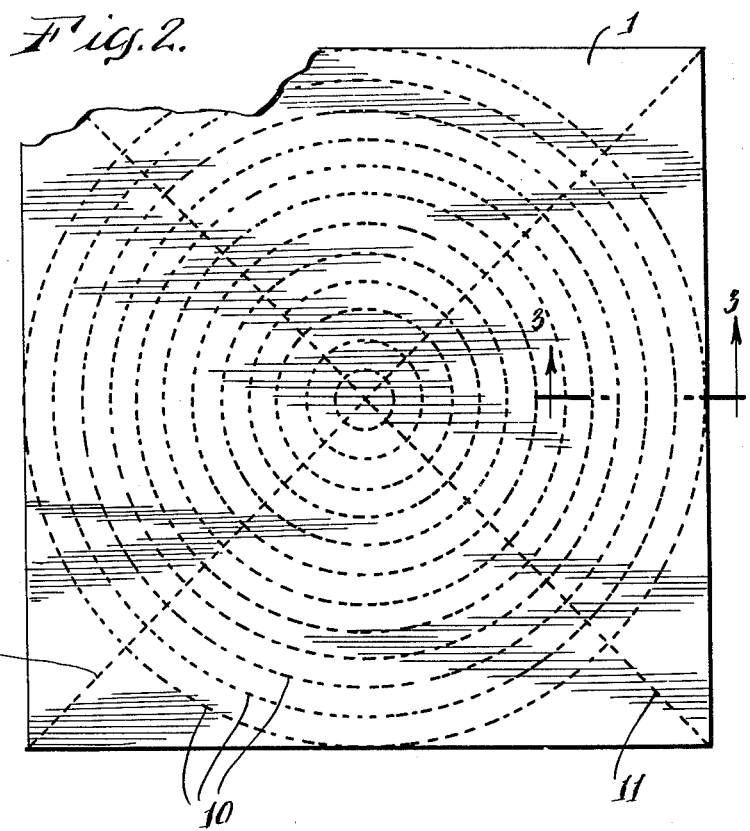
FIG. 2 is a plan view from the top of the covering in the form in which it would be sold.
Figure 4:
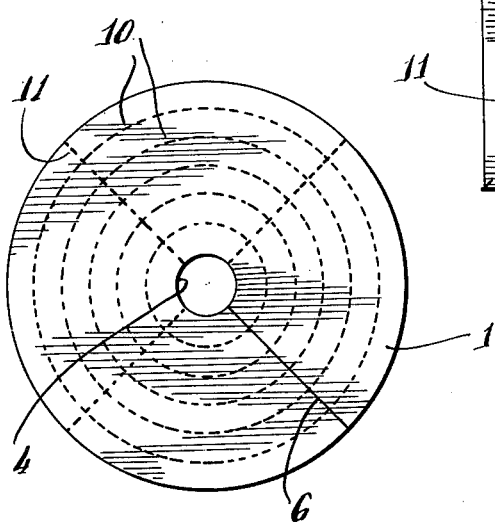
FIG. 4 is a view of a disc covering torn to size and ready to be mounted.

FIG. 2 shows covering 1 before it has been cut to size. It will be noted that it is square in shape and has a series of concentric perforations 10 and a pair of diagonal, i.e., radical perforations 11. These perforations are made with a standard die press and clicked out on the cellulose paper backing after the film has been applied. By tearing along the set of perforations desired for the size desired, disc 1 can be made to appear as is shown in FIG. 4.

Figure 3:
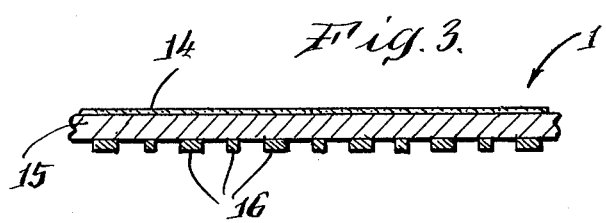
FIG. 3 is a section of a small portion of the covering of FIG. 2 showing the relationship between the plastic film, the heavy paper and the beads of fertilizer.

FIG. 3 is a cross-section of a small portion of disc 1. It shows the upper plastic film layer 14, the intermediate cellulostic paper 15 and the beads 16 of fertilizer and/or fungicide secured to the underside of paper 15. It will be noted that the beads are of differing sizes.

Film 14 may be any one which transmits gases, such as oxygen and carbon dioxide, and retains moisture. One that has been found useful is sold by American Can Company under the name "Soft-Gard." It is of 90 gauge thickness and has a permeability to oxygen of 7,000 milli-liters per square meter per 24 hours and to carbon dioxide of 14,700 milli-liters per square meter per 24 hours. (Both at 73°F and 50% relative humidity). Yet, at 90% relative humidity and 45°F, water vapor transmission is only 0.187 gram per 100 square inches per 24 hours.

Various kinds of paper 15 can be used. Preferably the paper is absorbent and not water-repellent. It was found that the most satisfactory one was a biodegradable cellulose paper such as blotter paper. There also may be instances in which only film is used, and no paper, with the beads being adhered directly to the film.

The film 14 may be secured to paper 15 with any desirable adhesive which does not destroy the characteristics of film 14. One technique is to apply silicone spray and a wax on the paper, apply the film to that, and iron the entire surface with a hot iron.

The beads 16 are made of a combination of active and inert ingredients in a water-soluble ink-type formulation. The base formulation includes additives such as white flour base, peanut oil, and coloring such as soluble green tempera or finger paints. The composition of the beads is approximately 20% inert ingredients and 80% active ingredients. In the preferred formulation the 80% active ingredients would be primarily plant foods constituting ammonium phosphate, urea, and potassium chloride making up 75.5 to 75.0% and secondary plant foods making up 0.1 to 0.5%. Approximately 4% of the total could be used for fungicide, if desired, a satisfactory fungicide being "Thiram" which is tetramethylthiuramdisulfide.

The beads are applied to the bottom surface of the paper 15 in a manner which will be described below and, preferably, are of different sizes. This is desirable so that the beads will dissolve in the water at different rates of speed.

Figure 5:
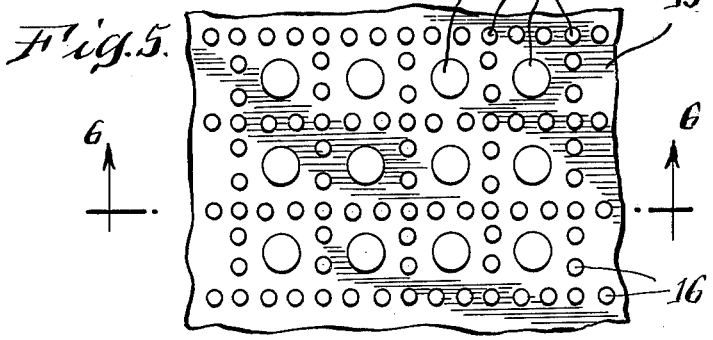
FIG. 5 is a portion of the underside of the disc showing a typical arrangement of beads of fertilizer and fungicide.

FIGS. 5 and 3 show a portion of the underside of disc 1 and a cross-section, respectively. As can be seen the beads are of varying sizes. The beads may be applied to the paper by various techniques such as silk screening, roller coating through a stencil, rubber stamping, wood stamping, squeegeeing through a stencil, use of a granulated fertilizer in the first instance and adhering by use of an adhesive wax, laquer or paint, a powdered form applied to an adhesive, or an encapsulated time release fertilizer; preferably they are applied through a stencil to an adhesive.

Figure 6:
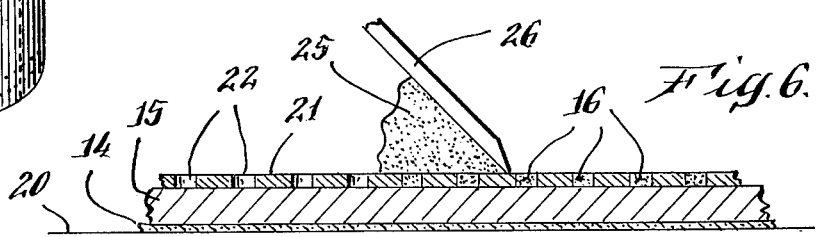
FIG. 6 is a view showing the method of applying the fertilizer-fungicide mixture to the paper backing.

The simplest form for applying the beads to the paper is shown in FIG. 6. There paper 15 with its bottom surface upward is placed on table 20. A stencil 21 is rested on the paper and the stencil includes a series of holes 22. The stencil is of a total thickness equal to the desired depth of the beads and contains a series of holes 22 which can be of the same or different sizes to determine the size of the beads. The moist bead mixture 25 is scraped along the upper surface of the stencil 21 by use of a squeegee 26 which forces the fertilizer-fungicide mixture in the holes 22 forming beads 16. The beads may then be allowed to dry and adhere to the paper or, if a release agent is used within holes 22, the stencil may be immediately removed for the beads to dry either naturally or through the application of heat. The beads are best applied after perforation.

When a disc 1 is in place and the plant is watered, water can enter the pot 2 through opening 4, around the edges of disc 1 or through the perforations, thus moistening the earth in the pot. This moisture will not only be used by the plant but will also serve to dissolve a portion of the fertilizer-fungicide beads. Moisture will also be retained in the paper and will be later drawn into the soil with additional fertilizer-fungicide. Due to the nature of the film 14, gases such as oxygen and carbon dioxide may be transmitted through the disc covering, but moisture is retained inside the pot.

Figure 7:
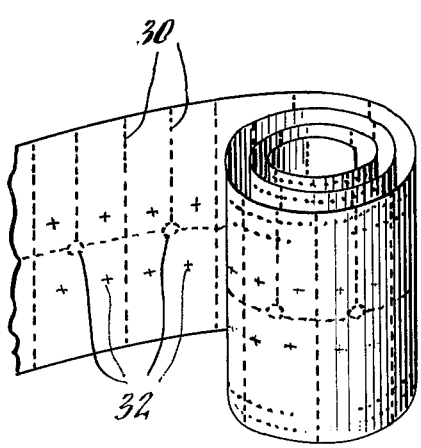
FIG. 7 shows a modification of the invention in which it is prepared in a roll for use in outdoor gardening.

FIG. 7 simply shows the perspective view of the modification of the invention in which the film-paper-bead laminate is in long roll form, preferably for use in large surfaces outdoors. This roll may have perforations 30 in it so that the various tearing processes may be followed, if desired, just as with the discs themselves. When the material is unrolled in flower and vegetable plant gardens, it acts as mulch and in addition it fertilizes every time it rains or the row is watered, it adds fungicide to discourage mildew and fungus. It may be cut or perforated, as at 32, to indicate a variety of equally spaced seed or plant positions, the mulch keeps the weeds out retaining moisture and keeps the earth and germinating seeds warm.

When initially devised, samples of the discs were made up, cut out and tested on living plants. It was found that the samples kept the plants moist for some two weeks without additional watering. By contrast, test plants, grown without the use of the discs in the same atmosphere, were bone dry in about four days. In addition, plants with the discs became green and healthy as fertilizer was absorbed. It would thus appear that a technique has been developed for encouraging and simplifying plant growth.

I claim:

1. A universal soil cover for use with plants in different sized containers and being capable of retaining moisture in the soil and dispensing plant-useful material to the soil but permitting the passage of air to the soil including
   a sheet of biodegradable cellulostic material capable of retaining water,
   a plastic film adhered to the upper surface of said water-retaining sheet,
   said film of a type permitting the passage of air therethrough but being repellent to water,
   beads of water-soluble plant useful material such as fertilizer or fungicide uniformly secured to the lower surface of said water-retaining sheet, whereby water retained in the sheet will be drawn down into the soil and will carry dissolved water-soluble plant-useful material from the beads into the soil,
   opening means in said composite sheet and film to receive a plant stem,
   at least one separation line in the composite sheet extending outwardly from the stem opening to permit the composite sheet to be placed around a plant stem, and
   a plurality of rows of spaced perforations in said composite sheet and film adapted to permit ready tearing away of outer portion of said cover to reduce it to a size conforming to a container holding said plant,
   whereby said cover may surround the stem of a plant in a container to retain moisture and dispense plant-useful material therein without preventing aeration of the plant's root structure.

2. A soil cover as set forth in claim 1 in which said perforations form a series of concentric circles, and in which said separation line extends radially.

3. A soil cover as set forth in claim 1 in which said beads include fertilizer.

4. A soil cover as set forth in claim 1 in which said beads include fungicide.

5. A soil cover as set forth in claim 1 in which said beads are of varying size so that they dissolve over differing time periods.

* * * * *